United States Patent [19]

Ali et al.

[11] Patent Number: 5,550,094
[45] Date of Patent: Aug. 27, 1996

[54] BINARY COCATALYST COMPOSITIONS FOR ACTIVATING HETEROGENEOUS POLYMERIZATION CATALYSTS

[75] Inventors: Ahmed H. Ali, Beaumont, Tex.; Vaseem Firdaus, Somerset, N.J.; Tomas A. Geoghegan, Bedminster, N.J.; Yury V. Kissin, East Brunswick, N.J.; Robert I. Mink, Warren, N.J.

[73] Assignee: Mobil Oil Corporation, Fairfax, Va.

[21] Appl. No.: 456,977

[22] Filed: Jun. 1, 1995

Related U.S. Application Data

[62] Division of Ser. No. 171,055, Dec. 21, 1993.

[51] Int. Cl.$^6$ .......................................................... C08F 4/64
[52] U.S. Cl. ........................... 502/115; 502/116; 526/118; 526/128
[58] Field of Search ................................. 502/103, 110, 502/115, 116, 132; 526/152

[56] References Cited

U.S. PATENT DOCUMENTS

| | | | |
|---|---|---|---|
| 4,342,855 | 8/1982 | Akimoto et al. | 526/153 |
| 4,647,633 | 3/1987 | Kostelnik | 526/153 |
| 4,806,433 | 2/1989 | Sasaki et al. | 502/115 |
| 4,888,318 | 12/1989 | Allen et al. | 502/115 |
| 5,118,648 | 6/1992 | Furtek et al. | 502/115 |
| 5,258,345 | 11/1993 | Kissin et al. | 502/115 |

*Primary Examiner*—Glenn A. Caldarola
*Attorney, Agent, or Firm*—Ronald A. Bleeker; Malcolm D. Keen; Marina V. Schneller

[57] ABSTRACT

A catalyst composition for copolymerizing ethylene with alpha-olefins is prepared by supporting a magnesium compound and a titanium compound on a solid, inert porous carrier, and activating the precursor with a mixture of dimethylaluminum chloride and a trialkylaluminum compound. Products with a bimodal molecular weight distribution are produced which are free of alpha-olefin oligomers.

18 Claims, 1 Drawing Sheet

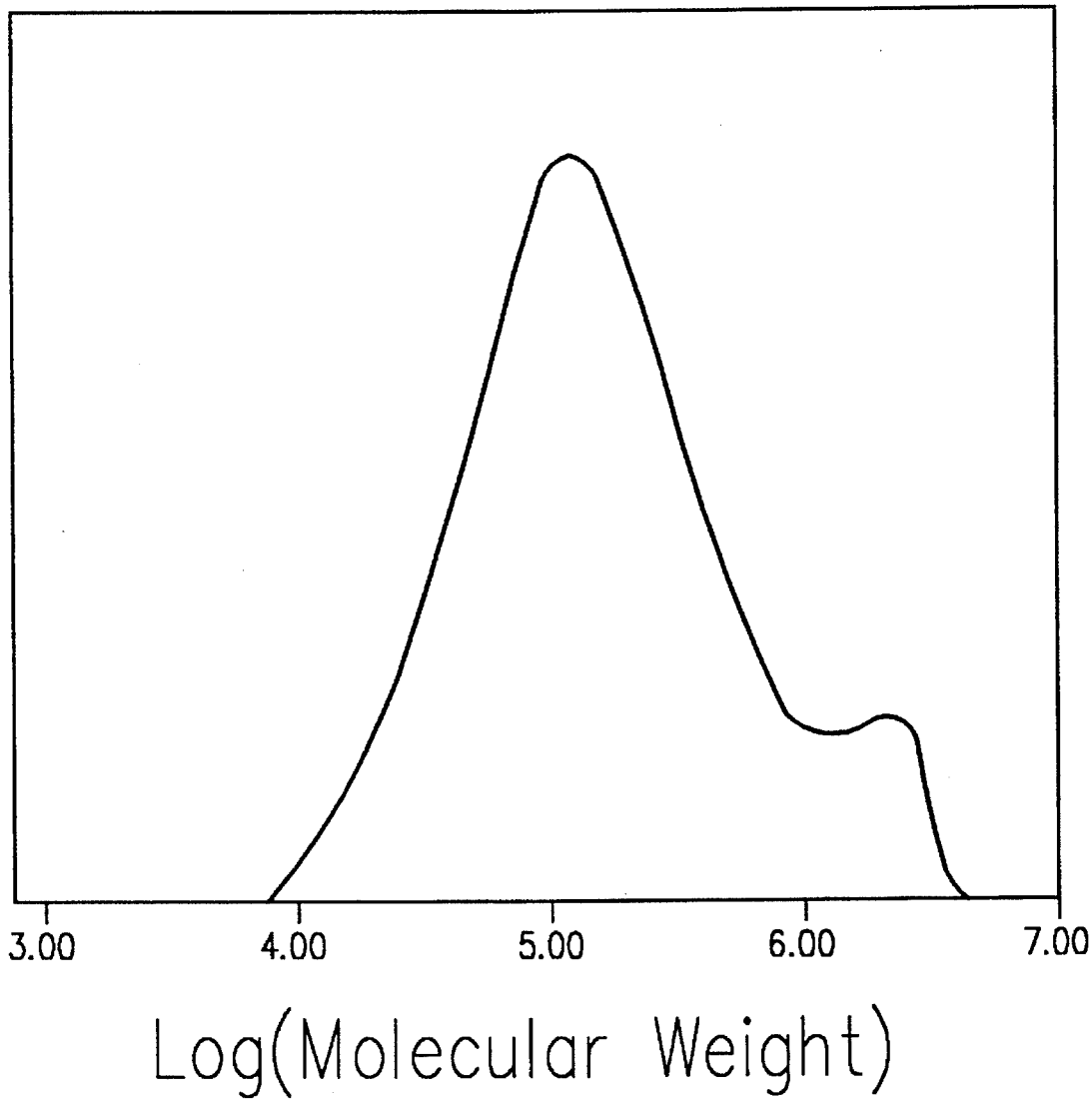

5,550,094

BINARY COCATALYST COMPOSITIONS FOR ACTIVATING HETEROGENEOUS POLYMERIZATION CATALYSTS

This is a division of copending application Ser. No. 08/171,055, filed on Dec. 21, 1993.

FIELD OF THE INVENTION

The present invention relates to a process for polymerizing ethylene, to catalyst compositions for use in polymerizing ethylene and to a method of producing such catalysts.

The invention relates to binary cocatalyst compositions containing dimethylaluminum chloride (DMAC) and a trialkylaluminum compound. The binary cocatalyst compositions are used in combination with supported catalyst precursors comprising a support, a source of titanium and a source of magnesium, to form activated catalyst compositions for ethylene/alpha-olefin copolymerizations. The catalyst compositions exhibit high activity and high selectivity for ethylene/olefin copolymerizations free of alpha-olefin oligomers. Moreover, the catalyst compositions of the invention provide ethylene copolymers with bimodal molecular weight distributions.

BACKGROUND OF THE INVENTION

As far as catalysts for copolymerization of ethylene with alpha-olefins are concerned, three properties of the catalysts are of a major importance:
1) molecular weight distributions of the resins produced with the catalysts,
2) the response of the resin molecular weight to hydrogen,
3) ability of the catalysts to effectively copolymerize ethylene and alpha-olefins.

One of the measures of the molecular weight distribution of linear low density polyethylene (LLDPE) resins is the melt flow ratio (MFR), which is the ratio of the high-load melt flow index ($I_{21}$) to the melt index ($I_2$) for a given resin: MFR=$I_{21}/I_2$. The MFR value is believed to be an indication of the molecular weight distribution of a polymer: the higher the MFR value, the broader the molecular weight distribution.

Molecular weight of ethylene copolymers can be controlled in a known manner, e.g., by using hydrogen. With the catalyst compositions produced according to the present invention, molecular weight can be suitably controlled with hydrogen when the polymerization is carried out at temperatures from about 30° to about 105° C. This control may be evidenced by a measurable positive change in the $I_2$ and $I_{21}$ values of the polymers produced. A relatively high sensitivity of the resin molecular weight to the amount of hydrogen present during the polymerization process is an important feature of the catalyst compositions of this invention.

Still another important property of catalyst compositions for ethylene/alpha-olefin copolymerization is the ability thereof to effectively copolymerize ethylene with higher alpha-olefins, e.g., $C_3$–$C_{10}$ alpha-olefins, to produce resins having low densities. This property of the catalyst composition is referred to as "higher alpha-olefin incorporation property" and is usually measured by determining the amount of a higher alpha-olefin (e.g., 1-butene, 1-hexene or 1-octene) required in a polymerization process to produce a copolymer of ethylene and the higher alpha-olefin having a given copolymer composition and a given density. The lesser is the amount of a higher alpha-olefin required to produce the resin of a given density, the higher are the production rates and, therefore, the lower is the cost of producing such a copolymer. Effective higher alpha-olefin incorporation is especially important in the gas-phase fluidized bed process, because relatively high concentrations of higher alpha-olefins in the fluidzed bed reactor may cause poor particle fluidization.

It is an object of the present invention to provide high-activity catalyst compositions for copolymerization of ethylene and alpha-olefins yielding products with bimodal molecular weight distributions.

It is an additional object of the present invention to provide a catalytic process for copolymerizing ethylene and alpha-olefins which yields LLDPE with a bimodal molecular weight distribution at high productivity.

It is also an object of the present invention to provide high activity catalyst compositions for the copolymerization of ethylene and alpha-olefins which exhibit a relatively high melt flow index response to hydrogen.

The beneficial effect of DMAC as a cocatalyst component has been examined. In copolymerization reactions, catalyst compositions containing DMAC exhibit the properties of good alpha-olefin incorporation, and, more significantly, produce resins with broad or bimodal molecular weight distributions. As shown in the FIGURE the products of DMAC-cocatalyzed ethylene copolymerizations contain a high molecular weight component; this high molecular weight component can account for the increased MFR values attributable to the products compared to products produced with trialkylaluminum cocatalysts. The products of DMAC-cocatalyzed ethylene copolymerizations exhibit processability advantages and superior mechanical properties compared to resins cocatalyzed by triethylaluminum (TEAL) or trimethylaluminum (TMA). Specifically, the DMAC-cocatalyzed products exhibit excellent gloss and low haze characteristics as well as excellent dart impact resistance.

However, DMAC as a cocatalyst component exhibits less activity than trialkylaluminum compounds. Moreover, the catalyst compositions containing DMAC alone as a cocatalyst exhibit decreased hydrogen response. Moreover, the DMAC cocatalyst under certain polymerization conditions exhibits a significant propensity for production of alpha-olefin oligomers. The oligomers foul gas-phase fluidized bed polymerization reactors and cause reactor shutdowns.

SUMMARY OF THE INVENTION

The invention relates to catalyst compositions which are selective for producing copolymers of ethylene which are free of alpha-olefin oligomers and are characterized by bimodal molecular weight distributions. The catalyst compositions comprise an activating amount of a mixture of DMAC and a trialkylaluminum compound selected from the group consisting of TEAL and TMA, wherein the mixture has a ratio of DMAC to the trialkylaluminum compound in the range of 30:1 to 300:1, and a solid catalyst precursor. The catalyst compositions comprising the binary cocatalyst systems also exhibit improved activity and hydrogen response, in addition to eliminating the formation of alpha-olefin oligomers. Accordingly, the catalyst compositions of the invention can ameliorate or eliminate reactor fouling caused by alpha-olefin oligomers which are oils.

The catalyst precursor compositions which are activated with the binary cocatalyst mixtures comprise heterogeneous precursor compositions, which means that the catalyst components are supported, preferably on silica. The catalytic components on the support comprise magnesium metal and titanium metal. The precursor can be made by extremely different synthesis techniques.

BRIEF DESCRIPTION OF THE DRAWING

The FIGURE is a gel permeation chromatogram of ethylenehexene copolymer prepared in a gas phase reactor with a catalyst system comprising the catalyst precursor of Example A and the DMAC:TMA mixture at a 300:1 molar ratio.

DETAILED DESCRIPTION OF THE INVENTION

Cocatalyst Mixtures

The catalyst compositions of the invention comprise solid catalyst precursors and an activating amount of a mixture of DMAC and a trialkylaluminum compound as a cocatalyst. The trialkylaluminum compound can contain alkyl groups of 1 to 6 carbon atoms. Preferably it is selected from the group consisting of TEAL and TMA. The binary mixtures have a ratio of DMAC to trialkylaluminum in the range of 30:1 to 300:1. The mixtures of DMAC and trialkylaluminum compound is referred to as cocatalysts.

The amount of the cocatalyst is conventionally expressed in terms of the number of moles of DMAC in the mixture per gram atom of titanium in the catalyst precursor, and varies from about 5 to about 500, preferably about 50 to about 300 moles of DMAC per gram atom of titanium. The DMAC-containing binary cocatalyst is employed in an amount which is at least effective to promote the polymerization activity of the solid component of the precursor. The catalyst composition may be activated in a polymerization reactor by adding the cocatalyst mixture and the catalyst precursor separately to the polymerization medium. It is also possible to combine the catalyst precursor and the cocatalyst mixture before the introduction thereof into the polymerization medium, e.g., for up to about 2 hours prior to the introduction thereof into the polymerization medium, at a temperature of from about –40° to about 100° C. The molar ratios of DMAC:trialkylaluminum can range from 40:1 to 400:1 in the gas phase, to eliminate alpha-olefin oligomer formation; the molar ratios at the higher end of the range are preferred from a product molecular weight distribution standpoint. Accordingly, the molar ratios are preferably in the range of 100 to 300.

Catalyst Precursor Synthesis

Catalyst precursors used in the present invention are described below in terms of the manner in which they are made.

The metals in the catalyst precursor preferably include magnesium and titanium on the carrier. The magnesium and titanium sources can be applied to the carrier in a variety of different ways. In one method, a catalyst precursor is formed by:

(A) providing a slurry of silica carrier in a non-polar solvent;

(B) adding to the slurry of step (A) an organomagnesium compound;

(C) adding to a slurry of step (B) one or several organo-silicon compounds;

(D) adding to the slurry of step (C) a transition-metal compound soluble in non-polar hydrocarbons;

(E) adding to the slurry of step (D) an additional amount of an organomagnesium compound;

(F) drying the catalyst precursor.

In another embodiment the catalyst precursor formation comprises:

(A) dissolving a magnesium compound and a titannnium compound in a polar solvent; and (B) contacting the solution of step (A) with a solid, inert porous carrier and removing the solvent by drying.

DESCRIPTION OF SPECIFIC EMBODIMENTS

Heterogeneous catalyst precursors of the invention are supported on a carrier. The carrier material is a solid, particulate, porous, preferably inorganic material. These carrier materials include inorganic materials such as oxides of silicon and/or aluminum. The carrier material is used in the form of a dry powder having an average particle size of from about 1 micron to about 250 microns, preferably from about 10 microns to about 150 microns. The carrier material is porous and has a surface area of at least about 3 square meters per gram ($m^2/g$), and preferably at least about 50 $m^2/g$. The carrier material should be free of absorbed water. Drying of the carrier material can be effected by heating at about 100° C. to about 1000° C., preferably at about 600° C. When the carrier is silica, it is heated at least 200° C., preferably about 200° C. to about 850° C. and most preferably at about 600° C.

In the most preferred embodiment, the carrier is silica which, prior to the use thereof in the first catalyst synthesis step, has been dehydrated by fluidizing it with nitrogen or air and heating at about 600° C. for about 4–16 hours to achieve a surface hydroxyl group concentration of about 0.7 millimoles per gram. The silica of the most preferred embodiment is a high surface area, amorphous silica (surface area=300 $m^2/g$; pore volume of 1.65 $cm^3/g$ ). The silica is in the form of spherical particles, e.g., as obtained by a spray-drying process.

Precursors formed in Non-polar Solvents

The slurry of a carrier material in a non-polar solvent is prepared by introducing the carrier into the solvent, preferably while stirring, and heating the mixture to about 25° to about 100° C., preferably to about 40° to about 65° C. The slurry is then contacted with the an organomagnesium compound, while the heating is continued at the aforementioned temperature.

The organomagnesium compound has the empirical formula $R_mMgR'_n$ wherein R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n=2.

Suitable non-polar solvents are materials which are liquid at reaction temperatures and in which all of the reactants used herein, e.g., the organomagnesium compound, the transition metal compound, and the silicon compound are at least partially soluble. Preferred non-polar solvents are alkanes, such as isopentane, hexane, heptane, octane, nonane, and decane, although a variety of other materials including cycloalkanes, such as cyclohexane, aromatics, such as toluene and ethylbenzene, may also be employed. The most preferred non-polar solvents are isopentane, hexane, or heptane. Prior to use, the non-polar solvent should be purified to remove traces of water, oxygen, polar compounds, and other materials capable of adversely affecting catalyst activity.

In the most preferred embodiment of the synthesis of this catalyst it is important to add only such an amount of the organomagnesium compound that will be completely deposited—physically or chemically—onto the support since any excess of the organomagnesium compound in the solution may react with other synthesis chemicals and precipitate outside of the support. The exact molar ratio of the organomagnesium compound to the hydroxyl groups in the support will vary and must be determined on a case-by-case basis to assure that only so much of the organomagnesium compound is added to the solution as will be deposited onto the support without leaving any excess of the organomagnesium compound in the solution.

For example, for the silica heated at about 600° C., the amount of the organomagnesium compound added to the slurry is such that the molar ratio of Mg to the hydroxyl groups in the carrier is about 1:1 to about 4:1, preferably about 1.1:1 to about 2.8:1, more preferably about 1.2:1 to about 1.8:1 and most preferably about 1.4:1.

The amount of the magnesium compound which is impregnated onto the carrier should also be sufficient to react with the subsequently added silane compound and then the transition metal compound in order to incorporate a catalytically effective amount of the transition metal on the carrier in the manner set forth herein below.

The second step of the catalyst precursor preparation involves the silane compound which has the empirical formula $(R^1O)_xSiR^2_{4-x}$, wherein $R^1$ is a hydrocarbyl group of 1 to 10 carbon atoms; $R^2$ is a halogen atom, preferably a chlorine atom, a hydrogen atom or a hydrocarbyl group of 1 to 10 carbon atoms, and x is 1, 2, 3, or 4. Preferred species are those defined as $Si(OR)_4$, wherein R is a $C_1$–$C_{10}$ hydrocarbyl group. Hydrocarbyl groups include alkyl, aryl, arylalkyl, alkenyl and arylalkenyl groups, containing 1 to 10 carbon atoms. Specific silane compounds which can be used in accordance with the invention include tetramethoxysilane, dimethoxydimethylsilane, tetraethoxysilane, phenoxytrimethylsilane, triethoxyethylsilane, diethoxydiethylsilane, chlorotriethoxysilane, phenyltriethoxysilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, diethoxydiphenylsilane, tetraphenoxysilane, triethoxyphenylsilane, tetrakis(2-methoxyethoxy)silane, tetrakis(2-ethylhexoxy)silane, and tetraallyloxysilane.

For introduction of the silane compound, the slurry of the carrier containing the organomagnesium species is maintained at temperatures of about 40° to about 65° C. The amount of the silane compound added to the slurry is such that the molar ratio of the silane compound to Mg fixed on the solid carrier is about 0.30 to about 1.40. In one embodiment, prior to the aforementioned silane compound incorporation into the organomagnesium-containing intermediate, the intermediate is preliminarily treated with $SiCl_4$. The molar ratio of $SiCl_4$ to Mg fixed on the solid carrier ranges from 0.30 to 1.40.

In the next step, the slurry is contacted with at least one transition metal compound soluble in a non-polar solvent. This synthesis step is conducted at about 25° to about 75° C., preferably at about 30° to about 70° C., and most preferably at about 45° to about 65° C. In a preferred embodiment, the amount of the transition metal compound added is not greater than that which can be deposited onto the carrier. The exact molar ratio of Mg to the transition metal will therefore vary and must be determined on a case-by-case basis. For example, for the silica carrier heated at about 200° to about 850° C., the amount of the transition metal compound is such that the molar ratio of fixed Mg to the transition metal is equal to 0.5 to about 3, preferably about 1 to about 2.

Suitable transition metal compounds used herein are compounds of metals of Groups 4 and 5 (new IUPAC notation) of the Periodic Chart of the Elements, providing that such compounds are soluble in non-polar solvents. Non-limiting examples of such compounds are titanium halides (e.g., titanium tetrachloride), titanium alkoxides, wherein the alkoxide moiety consists of an alkyl radical of 1 to about 6 carbon atoms, or combinations thereof, vanadium halides, (vanadium tetrachloride, vanadium oxytrichloride), and vanadium alkoxides. The preferred transition metal compounds are titanium compounds, preferably tetravalent titanium compounds. The most preferred titanium compound is titanium tetrachloride. Mixtures of such transition metal compounds may also be used and generally no restrictions are imposed on the transition metal compounds which may be included. Any transition metal compound that may be used alone may also be used in conjunction with other transition metal compounds.

The molar ratio of the tetravalent titanium compound to the organomagnesium compound may be from about 0.3 to about 2, more particularly from about 0.5 to about 1.0. An unreacted titanium compound may be removed by suitable separation techniques such as decantation, filtration and washing.

After transition metal (e.g. titanium) incorporation, an essential final step in the catalyst precursor synthesis comprises a second addition of an organomagnesium compound to the titanium-containing intermediate. This additional treatment with an organomagnesium compound produces superior catalyst compositions.

The organomagnesium compound used in the last step of the catalyst precursor preparation has the empirical formula $R_mMgR_n'$ wherein R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups, and m and n are each 0, 1 or 2, providing that m+n=2. The molar ratio of the organomagnesium compound used in the last step to the organomagnesium compound used in the first step ranges from 0.2 to 1.5.

This second treatment with an organomagnesium compound increases the catalytic activity of the resulting catalyst compositions compared to the activity of the catalyst compositions formed with a single organomagnesium incorporation step, and increases the melt flow index response to hydrogen compared to the melt flow index response of the catalyst formed with a single organomagnesium incorporation step.

Precursors formed in Polar Solvents

Suitable transition metal compounds are compounds of Groups 4 and 5 (new IUPAC notation) of the Periodic Chart of the Elements, e.g., compounds of titanium and vanadium. Of these compounds, the compounds of titanium are most preferred.

The titanium compounds employed in preparing the precursors have the formula $Ti(OR)_aX_b$, wherein R is an aliphatic or aromatic hydrocarbon radical containing from 1 to 14 carbon atoms, or COR' where R' is an aliphatic or aromatic hydrocarbon radical containing from 1 to 14 carbon atoms, X is selected from the group-consisting of Cl, Br, I, and combinations thereof, a is 0, 1 or 2, b is 1 to 4 inclusive, and a+b=3 or 4.

Suitable titanium compounds include $TiCl_3$, $TiCl_4$, $Ti(OCH_3)Cl_3$, $Ti(OC_6H_5)Cl_3$, $Ti(OCOCH_3)Cl_3$ and $Ti(OCOC_6H_5)Cl_3$.

The formula of the magnesium compound employed in preparing the precursors is $MgX_2$, wherein X is selected from the group consisting of Cl, Br, I, and combinations thereof. Suitable magnesium compounds include $MgCl_2$, $MgBr_2$ and $MgI_2$. Anhydrous $MgCl_2$ is particularly preferred.

The polar solvent employed in preparing the precursors is an organic compound which is liquid at 25° C. and in which the titanium and magnesium compounds are soluble. Suitable polar solvents include alkyl esters of aliphatic and aromatic carboxylic acids, aliphatic ethers, cyclic ethers and aliphatic ketones. Among these solvents, the preferable ones are alkyl esters of saturated aliphatic carboxylic acids containing from 1 to 4 carbon atoms; alkyl esters of aromatic carboxylic acids containing from 7 to 8 carbon atoms; aliphatic ethers containing from 2 to 8 carbons atoms, preferably from 4 to 5 carbon atoms; cyclic ethers containing from 4 to 5 carbon atoms, preferably mono- or diethers containing 4 carbon atoms; and aliphatic ketones containing from 3 to 6 carbon atoms, preferably from 3 to 4 carbon atoms. The most preferred of these solvents include methyl formate, ethyl acetate, butyl acetate, ethyl ether, tetrahydrofuran, dioxane, acetone and methylethyl ketone.

The precursor composition is formed by dissolving at least one transition metal compound, such as a titanium compound, and at least one magnesium compound in the solvent at a temperature of from about 20° C. up to the boiling point of the solvent. The titanium compound(s) can be added to the polar solvent before or after the addition of the magnesium compound, or concurrent therewith. The dissolution of the titanium compound(s) and the magnesium compound can be facilitated by stirring, and in some instances by refluxing slurries of these two compounds in the solvent.

About 0.5 mol to about 56 mol, and preferably about 1 mol to about 10 mol, of the magnesium compound are used per mole of the titanium compound(s) in preparing the precursor.

Impregnation of the inert carrier material with the precursor composition may be accomplished by mixing the support with the dissolved precursor composition. The solvent is then removed by drying at temperatures up to about 85° C.

Suitably, the impregnated carrier material contains from about 3 percent by weight to about 50 percent by weight, preferably from about 10 percent by weight to about 30 percent by weight, of the catalyst precursor composition.

POLYMER PRODUCTS OF THE INVENTION

The polymers prepared in the presence of the catalyst compositions of this invention are linear copolymers of ethylene and higher alpha-olefins. The polymers exhibit relatively broad molecular weight distributions as compared to similar polymers prepared in the presence of previously known catalyst compositions. The copolymers are free of alpha-olefin oligomers and are characterized by bimodal molecular weight distributions, as shown in the FIGURE.

The ethylene copolymers prepared in accordance with the present invention may be copolymers of ethylene with one or more $C_3$–$C_{10}$ alpha-olefins. Thus, copolymers having two monomeric units are possible as well as terpolymers having three monomeric units. Particular examples of such polymers include ethylene/propylene copolymers, ethylene/1-butene copolymers, ethylene/1-hexene copolymers, ethylene/4-methyl-1-pentene copolymers, ethylene/1-butene/1-hexene terpolymers, ethylene/propylene/ 1-hexene terpolymers and ethylene/propylene/1-butene terpolymers. The most preferred polymers are copolymers of ethylene with 1-hexene, 1-butene or 4-methyl-1-pentene.

The ethylene copolymers produced in accordance with the present invention preferably contain at least about 80 percent by weight of ethylene units, and most preferably contain about 90 percent of ethylene units.

The molecular weight distributions of the polymers prepared in the presence of the catalysts of the present invention, as expressed by the MFR values, varies from about 35 to about 60. As is known to those skilled in the art, such MFR values are indicative of a relatively broad molecular weight distribution.

The physical and mechanical properties of the films made from the resins polymerized with the catalysts of this invention are better than those of the resins polymerized with previously known cocatalyts for activating the same catalyst precursors. The films produced with these catalysts exhibit excellent optical properties (low haze and high gloss) and impact resistance (high dart impact resistance.)

POLYMERIZATION PROCESS CONDITIONS

Mixtures of ethylene with alpha-olefins are polymerized with the catalysts compositions prepared according to the present invention by any suitable process. Such processes include polymerizations carried out in suspension, in solution or in the gas phase. Gas-phase polymerization reactions are preferred, e.g., those taking place in stirred bed reactors and, especially, fluidized bed reactors. A particularly desirable method for producing linear low density ethylene copolymers according to the present invention is in a fluidized bed reactor. Such a reactor and means for operating the same are described by Levine et al, U.S. Pat. No. 4,011,382, and Karol et al, U.S. Pat. No. 4,302,566, the entire contents of both of which being incorporated herein by reference, and by Nowlin et al, U.S. Pat. No. 4,481,301.

For the production of ethylene copolymers in the process of the present invention an operating temperature of about 30° to 115° C. is preferred, and a temperature of about 75° to 95° C. is most preferred. Temperatures of about 75° to 90° C. are used to prepare products having a density of about 0.91 to 0.92, and temperatures of about 80° to 100° C. are used to prepare products having a density of about 0.92 to 0.94 and temperatures of about 90° to 115° C. are used to prepare products having a density of about 0.94 to 0.96. The fluidized bed reactor could be operated at pressures of up to about 1000 psi, and is preferably operated at a pressure of from about 150 to 350 psi. The molecular weight of the polymer may be controlled in a known manner, e.g., by using hydrogen when the polymerization is carried out at temperatures from about 70° to about 105° C.

The catalyst compositions of this invention yield granular resins having an average particle size between about 0.01 to about 0.07 inches and preferably about 0.02–0.04 inches.

Films having especially desirable properties may be formed with the above-mentioned ethylene/alpha-olefin copolymers prepared with the catalysts of the present invention by a variety of techniques. For example, desirable blown films as well as slot cast films may be formed. The resins of the invention also lend themselves to high-stalk extrusion.

Blown films formed from ethylene/alpha-olefin copolymers having a density from 0.916 to 0.935 g/cc may have especially desirable properties for plastic bag manufacture. A particular example of a blown film formed from an ethylene/1-hexene copolymer having a density of 0.927, which is formed in a gas-phase, fluid-bed reactor with catalyst compositions according to the present invention, is a blown film having improved dart impact strength, enhanced Elmendorf tear strength in the machine direction of the film.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column: reported as gms/cc. |
| Melt Index $I_2$ | ASTM D-1238- Condition E - Measured at 190° C. - reported as grams per 10 minutes. |
| High Load Melt Index $I_{21}$ | ASTM D-1238 - Condition F - Measured at 10.5 times the weight used in the melt index test above. |
| Melt Flow Ratio (MFR) = $I_{21}/I_2$ | |
| Hexene Content | Hexene contents of ethylene/1-hexene copolymers were measured by the infrared spectroscopic method, as described in the article of T. E. Nowlin, Y. V. Kissin and K. P. Wagner HIGH ACTIVITY ZIEGLER-NATTA CATALYST FOR THE PREPARATION OF ETHYLENE COPOLYMERS, Journal of Polymer Science: Part A: Polymer Chemistry, Volume 26, pages 755–764 (1988). |
| Dart Impact | ASTM D1709 Free Falling DART Method (F50) |

Catalyst Precursor Preparation

EXAMPLE A

Into a Schlenk flask was placed Davison grade 955 silica (7.0 g), which was previously calcined at 600° C., and heptane (90 ml). The flask was placed into an oil bath at ca. 55° C. and dibutylmagnesium (DBM; 7.00 mmol) was added to the silica slurry. After stirring the mixture at this temperature for 1 hour, $SiCl_4$ (4.6 mmol) was added, and the mixture was stirred at ca. 55° C. for another 1 hour. Then tetrabutoxysilane (4.6 mmol) was added to the mixture and the slurry was stirred at ca. 55°–60° C. for an additional 1.5 hours. Next, $TiCl_4$ (7.0 mmol) was added to the reaction medium and the mixture was stirred for 1 hour. Finally, DBM (7.0 mmol) was added to the slurry at 55°–60° C. The final mixture was stirred for ca. 1 hour and then heptane was removed by evaporation under a strong nitrogen flow to yield 10.2 g of light brown powder. Weight percent of Ti=2.91.

EXAMPLE B

A catalyst precursor was synthesized according to the teachings of Yamaguchi et al, U.S. Pat. No. 3,989,881, and Karol et al, European Patent Application 84103441.6. In a 12 liter flask equipped with a mechanical stirrer were placed 41.8 g (0.439 mol) of anhydrous $MgCl_2$ and 2.5 liters of tetrahydrofuran (THF). To this mixture, 29.0 g (0.146 mol) of $TiCl_3.0.33 AlCl_3$ powder were added over a 30 min. period. The mixture was then heated at 60° C. for another 30 min. in order to completely dissolve all materials.

Silica (500 g) was dehydrated at 600° C. and slurried in 3 liters of isopentane. The slurry was pretreated with TEAL (20 wt % solution 186 cc) in hexane, which was added to the stirred silica slurry over a 15 min period. The slurry was then dried under a nitrogen purge at 60° C. over a period of about 4 hours to provide a dry, free-flowing powder containing 5.5 percent by weight of the aluminum alkyl.

The pretreated silica was added to the solution of the catalyst precursor described above. The slurry was stirred for 15 min and then the solvent was dried under a nitrogen purge at 60° C. over a period of about 4 hours.

Ethylene/Alpha-Olefin Copolymerization Reactions

Examples 1–14 (Slurry Polymerization Reactions)

Ethylene/1-hexene copolymers were prepared with the catalyst precursors from EXAMPLES A and B. A typical example using the catalyst precursor described in EXAMPLE A is given below.

A 1.6-liter stainless-steel autoclave equipped with a magnet stirrer was filled with heptane (750 ml) and 1-hexene (120 ml) under a slow nitrogen purge at 50° C. and then 3.0 mmol of DMAC and the appropriate amount of TEAL or TMA were added. The reactor temperature was increased to 93° C., the internal pressure was raised 76 psi with hydrogen, and then ethylene was introduced to maintain the pressure at 184 psig. After that the reactor temperature was decreased to 80° C., the catalyst precursor was introduced into the reactor with ethylene overpressure, and the temperature was increased and held at 93° C. The polymerization was carried out for 60 minutes and then the ethylene supply was stopped. The reactor was allowed to cool to room temperature and the polyethylene was collected and dried in the air overnight.

A series of DMAC-TEAL mixtures were used as cocatalysts in slurry ethylene-1-hexene copolymerization reactions with Example A catalyst precursor at 93° C. and ethylene pressure of 100 psi. The results are given in Table 1.

TABLE 1

| Example | Cocatalyst molar ratio | Relative productivity (a) $I_{21}$ | MFR | Hexene content % |
|---|---|---|---|---|
| 1 | DMAC | 1.0 | 10 | 35 | 2.1 |
| 2 | DMAC/TEAL = 40:1 | 1.0 | 9 | 33 | 2.2 |
| 3 | DMAC/TEAL = 35:1 | 1.3 | 13 | 35 | 2.2 |
| 4 | DMAC/TEAL = 30:1 | 1.7 | 18 | 32 | 2.3 |
| 5 | DMAC/TEAL = 25:1 | 2.5 | 28 | 28 | 2.3 |
| 6 | DMAC/TEAL = 20:1 | 3.2 | 57 | 26 | 2.2 |
| 7 | TEAL | 1.7 | 280 | — | 1.9 |

(a) Productivity in the experiment with DMAC as a single cocatalyst was chosen as a standard.

The use of DMAC:TEAL mixtures results in higher catalyst productivities even at a TEAL:DMAC molar ratio as low as 1:35. This effect is even more pronounced at lower DMAC:TEAL ratios. Significantly, a catalyst precursor activated by a mixture of DMAC and TEAL can be more active than the same precursor activated by either DMAC or TEAL alone.

A series of DMAC-TMA mixtures were used as cocatalysts in slurry ethylene-1-hexene copolymerization reactions with Example A catalyst precursor at 93° C. and ethylene pressure of 100 psi. The results are given in Table 2.

TABLE 2

| Example | Cocatalyst molar ratio | Relative productivity (a) $I_{21}$ | % | Hexene content |
|---|---|---|---|---|
| 8  | DMAC          | 1.0 | 10  | 2.1 |
| 9  | DMAC/TMA = 40:1 | 1.2 | 15  | 2.2 |
| 10 | DMAC/TMA = 35:1 | 1.6 | 26  | 2.3 |
| 11 | DMAC/TMA = 30:1 | 2.0 | 32  | 2.3 |
| 12 | DMAC/TMA = 25:1 | 2.9 | 70  | 2.5 |
| 13 | DMAC/TMA = 10:1 | 4.9 | 310 | 2.8 |
| 14 | TMA           | 2.5 | 380 | 2.5 |

(a) Productivity in the experiment with DMAC as a single cocatalyst was chosen as a standard.

The addition of TMA to DMAC has two beneficial effects: a higher productivity and a higher flow index response: the Example A catalyst precursor activated by a mixture of DMAC and TMA can be more active than the same catalyst activated by either DMAC or TMA alone.

Examples 15–19 (Gas Phase Polymerization)

A series of ethylene-hexene copolymerization experiments was carried out in a gas-phase fluidized bed polymerization reactor. When DMAC alone was used as a cocatalyst and both catalyst precursors described above (Examples A and B) were used, the reactor was shut down several times, and inspections revealed a formation of oily hexene oligomers. However, there was no indication of oil formation when the DMAC-TMA mixtures were used with the Example A catalyst precursor. The results of the experiments with DMAC-TMA mixtures in the gas-phase reactor are given in Table 3.

TABLE 3

| Example | DMAC:TMA molar ratio | Productivity (lb/lb) (a, b) | Required $H_2C_2$ (c) | MFR (d) |
|---|---|---|---|---|
| 15 | 1:0   | 1500 | 0.55 | 50 |
| 16 | 30:1  | 5600 | 0.22 | 31 |
| 17 | 55:1  | 4700 | 0.21 | 31 |
| 18 | 150:1 | 3500 | 0.25 | 37 |
| 19 | 300:1 | 3000 | 0.30 | 42 |

(a) Productivity normalized to 7 bar and 3 hour residence time.
(b) All resins produced under conditions listed in Table 3 have a settled bulk density of 30 lb/ft$^3$.
(c) For a resin with $I_{21}$ of 7 and density of 0.930 g/cc.
(d) At 250 ppm DMAC feed into the reactor.

Similar to the data in Tables 1 and 2, addition of TMA to DMAC resulted in increased productivity of the catalyst. However, the preferred broad molecular weight distribution of the resins (corresponds to MFR values of 35–60) was not observed in the gas-phase reactor until the TMA concentration was adjusted to maintain a greater than 100:1 DMAC:TMA molar ratio. When TMA alone is used as a cocatalyst, the MFR value of the resin is merely in the 25–30 range.

In addition to the suppression of alpha-olefin oligomer formation, the use of DMAC-TMA mixtures as cocatalyst has other unexpected and unique advantages. Catalyst activity and hydrogen response were improved without sacrificing resin MFR values or their settled bulk density (ca. 30 lb/ft$^3$ in all examples in Table 3 vs. ca. 25 lb/ft$^3$ for TMA-cocatalyzed resins). For example, the data in Table 3 show that the 300:1 DMAC:TMA mixture improved activity by 100% over DMAC alone. The use of the mixture also reduced the required hydrogen pressure in the reactor by 30%. The resin produced with this catalyst composition had a bimodal molecular weight distribution (see FIGURE).

What is claimed is:

1. A fluid bed gas phase olefin polymerization catalyst composition, comprising a catalyst precursor and a binary cocatalyst mixture, for copolymerizing ethylene with alpha-olefins to form broad molecular weight distribution products characterized by MFR values ($I_{21}/I_2$) of 35 to 60 and free of alpha-olefin oligomers, comprising activating, in a fluid bed gas phase reactor, a solid catalyst precursor with an activating amount of a cocatalyst mixture which comprises dimethylaluminum chloride and a trialkylaluminum compound in a molar ratio of dimethylaluminum chloride:trialkylaluminum compound ranging from 30:1 to 300:1;
wherein the presence of trialkylaluminum eliminates the formation of alpha olefin oligomers;
wherein the catalyst precursor comprises a support,
which is silica, and magnesium and titanium components, wherein the catalyst precursor comprises an amount of titanium which ranges from 0.5 to 5 weight % of the catalyst precursor, wherein the catalyst precursor comprises a molar titanium to magnesium ratio which ranges from 0.2 to 1.0.

2. The catalyst composition of claim 1 prepared by a method comprising the steps of:

(i) contacting a slurry of a solid, porous carrier in a non-polar solvent with at least one organomagnesium compound having the formula $R_mMgR'_n$ where R and R' are the same or different $C_4$–$C_{12}$ alkyl groups, m and n are each 0, 1 or 2, provided that m+n=2; and (ii) contacting said intermediate of step (i) with at least one compound selected from the group consisting of (a) $SiCl_4$ and (b) a silane compound of the formula $(R^1O)_xSiR^2_{4-x}$ wherein x is 1 2, 3 or 4; $R^1$ is a hydrocarbyl group of 1 to 10 carbon atoms; and $R^2$ is a halogen atom or a hydrocarbyl group of 1 to 10 carbon atoms, or a hydrogen atom;

(iii) contacting said intermediate of step (ii) with at least one transition metal compound in a non-polar liquid medium, the molar ratio of the said transition metal compound to said organomagnesium compound in step (i) being 0.5 to 1.5; and (iv) contacting said transition metal-containing intermediate of step (iii) with an additional quantity of an organomagnesium compound $R_mMgR'_n$ where R and R' are the same or different $C_4$–$C_{12}$ alkyl groups, and m+n=2, followed by drying the slurry to prepare a supported catalyst precursor.

3. A catalyst precursor of claim 2 where the porous carrier is silica and wherein R and R' are $C_4$–$C_{10}$ alkyl groups.

4. A catalyst of claim 3, wherein R and R' are $C_4$–$C_8$ alkyl groups.

5. A catalyst of claim 4, wherein R and R' are each butyl groups.

6. A catalyst of claim 2 wherein the transition metal compound is titanium tetrahalide.

7. A catalyst of claim 6 wherein the titanium tetrahalide is titanium tetrachloride.

8. The catalyst composition of claim 2, wherein the silane compound is $Si(OR)_4$ or $Si(S"O)_x(R''')_{4-x}$ wherein each of R and R″ is a $C_1$–$C_{10}$ hydrocarbyl group, wherein R‴ is a chlorine atom, or a $C_1$–$C_{10}$ hydrocarbyl group or a hydrogen atom and x=1, 2 or 3.

9. The catalyst composition of claim 1, wherein the trialkylaluminum compound is trimethylaluminum.

10. The catalyst composition of claim 1, wherein the trialkylaluminum compound is triethylaluminum.

11. The catalyst composition of claim 1, wherein the precursor is made by a method comprising the steps of:
dissolving a magnesium compound and a titanium compound in a polar solvent at a titanium to magnesium molar ratio of 0.2 to 0.5; and
contacting the solution with a solid, inert porous carrier and removing the solvent by drying to form a catalyst precursor.

12. A catalyst composition of claim 11 wherein the magnesium compound has the empirical formula $MgX_2$ wherein X is Cl, Br, I or combinations thereof.

13. A catalyst composition of claim 12 wherein the magnesium compound is $MgCl_2$.

14. A catalyst composition of claim 13 wherein the titanium compound is $TiCl_3$, $TiCl_4$, $Ti(OCCH_3)Cl_3$, $Ti(OCH_3)Cl_3$, $Ti(OCOCH_3)Cl_3$ or $Ti(OCOC_6H_5)Cl_3$.

15. A catalyst composition of claim 14 wherein the titanium compound is $TiCl_3$ or $TiCl_4$.

16. A catalyst composition of claim 15 wherein the titanium compound is $TiCl_3$.

17. The catalyst composition of claim 11, wherein the trialkylaluminum compound is trimethylaluminum.

18. The catalyst composition of claim 11, wherein the trialkylaluminum compound is triethylaluminum.

* * * * *